(12) United States Patent
Cervantes et al.

(10) Patent No.: US 7,428,702 B1
(45) Date of Patent: Sep. 23, 2008

(54) METHOD AND SYSTEM FOR DYNAMIC MESSAGE CORRECTION

(75) Inventors: Ezequiel Cervantes, Tucson, AZ (US); Paul Anthony Jennas, Tucson, AZ (US); Mario Francisco Acedo, Tucson, AZ (US); Matthew J. Ward, Vail, AZ (US); Jason L. Peipelman, Vail, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/020,543

(22) Filed: Jan. 27, 2008

(51) Int. Cl.
*G06F 17/00* (2006.01)
(52) U.S. Cl. ...................... 715/255; 715/243
(58) Field of Classification Search .................. 715/255, 715/243, 246
See application file for complete search history.

(56) References Cited

U.S. PATENT DOCUMENTS

| | | | |
|---|---|---|---|
| 6,895,257 B2 | 5/2005 | Boman et al. | |
| 7,024,213 B2 | 4/2006 | Cleary | |
| 7,032,174 B2 | 4/2006 | Montero et al. | |
| 7,185,285 B2 | 2/2007 | Van Dok et al. | |
| 7,305,627 B2 | 12/2007 | Tannenbaum | |
| 2004/0260780 A1 | 12/2004 | Eisen | |
| 2005/0081057 A1 | 4/2005 | Cohen et al. | |
| 2006/0041848 A1* | 2/2006 | Lira | 715/805 |
| 2006/0161631 A1 | 7/2006 | Lira | |
| 2007/0005707 A1* | 1/2007 | Teodosiu et al. | 709/206 |
| 2007/0124387 A1 | 5/2007 | Galloway | |

FOREIGN PATENT DOCUMENTS

| | | |
|---|---|---|
| WO | WO0193515 | 12/2001 |
| WO | WO2007040525 | 4/2007 |

* cited by examiner

*Primary Examiner*—Laurie Ries
(74) *Attorney, Agent, or Firm*—MaxValueIP, LLC

(57) ABSTRACT

A system is presented to allow users in an instant messaging environment to edit already-exchanged messages dynamically, and resend the edited version of the message to the target users, as an example. The newly edited message received by the second user is clearly understandable because the corrected parts of the message have been tagged. Depending on the implementation, either a new complete and corrected message is sent, or the sent message indicates the recent editions. The advantage of this solution is that all that the altering user should do is to go over the communication text, change or edit the text, and press ENTER.

1 Claim, 3 Drawing Sheets

PRIOR ART

| Menu bar | |
|---|---|
| User 1 | In todays meeting we covered a lot of topics. We discussed the new test plan, and the new high priority items. I will be sending the meeting minutes and I need to go over them. Please do forget to this.<br><br>Thanks!<br><br>Oops! I made several mistakes. I meant "I need YOU to go over them. Also, "please do NOT forget to DO this" |

Typing pane

FIG 2

METHOD AND SYSTEM FOR DYNAMIC MESSAGE CORRECTION

BACKGROUND OF THE INVENTION

In the today's busy lifestyle, the role of electronic communication is becoming more and more important. The volume of email communications has exceeded the extent of telephone usage within corporations. Furthermore, instant messaging, as a form of electronic communication, has begun to expand during recent years. Initially, instant messaging was a tool used mainly in the chat rooms and for entertainment purposes, but now its applications are being extended to internal communications of corporations. Instant messaging has all of the advantages of email messaging compared to using the phone service, while not having many of its disadvantages of the email communication, namely its offline nature. It is also less intrusive than phone service. It can easily be recorded and archived, and storing such an archive does not require a large memory space.

Instant messaging technique, to be used as a serious method of communication, however, needs to be improved. For instance, in a chat session amongst users of an instant messaging application, it is quite common to misspell or forget words when exchanging messages with other users. Currently, the only known solutions are: (1) to ignore the problem and assume the other user understands what you meant; (2) to type another message explaining what words were initially misspelled, forgot, or added; or (3) to turn on the spell check option. The drawbacks to these solutions are that it takes extra time to re-write what is meant to say in the first place, or to explain where a mistake was made. In addition, the spell checker option can help with misspelled words, but it does not help if a user forgets words or adds extra words. Then, the chat partner receiving the corrections must go back, re-read the previous message, and add the corrections. One of the embodiments of this invention will solve this problem by making it easy and convenient for both users to understand the mistake and the correction.

SUMMARY OF THE INVENTION

One of the embodiments of this invention allows users in an instant messaging environment to dynamically edit previous messages that have been exchanged, and resend the edited version of the message to the target users. Upon receipt of the edited version of the message, the target user would clearly see the corrections made on the previously received message, or depending on implementation, they could see a new edited message. The advantage of this solution is that the altering user now does not have to explain the correction. All that this user needs to do after sending the wrong message, is that it goes over the communicated text, change or edit the text, and press ENTER. By pressing ENTER, either a new corrected message is sent to the second user, or the already-sent message shows the edited part by color or other formatting indications.

BRIEF DESCRIPTION OF THE DRAWINGS

FIG. 2 shows the second instant message by the first user in an attempt to fix the mistakes in the first message, as currently done in the prior art.

DETAILED DESCRIPTION OF THE PREFERRED EMBODIMENTS

A novel method to improve the efficiency of instant messaging is presented, as an example. One of the embodiments of this invention allows users in an instant messaging environment to dynamically edit previous messages that have been exchanged, and resend the edited version of the message to the target users. Upon receipt of the edited version of the message, the target user would clearly see the corrections made on the previously received message, or depending on implementation, they could see a new edited message. The advantage of this solution is that the altering user now does not have to explain where the correction has occurred. The recipient can see the whole message with the edited parts clearly shown.

Figure 1:
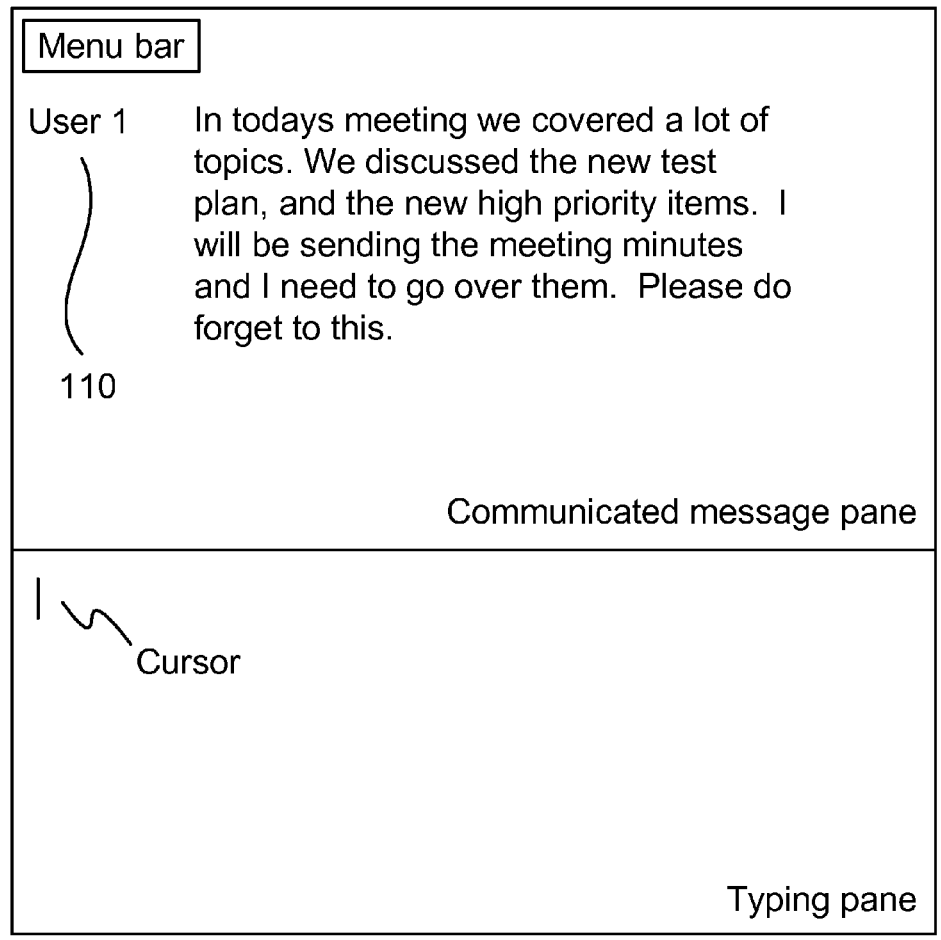
FIG. 1 illustrates the instant messaging environment when the first message containing some mistakes is sent.

In a typical conversation in an instant messaging system, one user sends a message to another user. Assume that the screen shown in FIG. 1 represents this interaction.

The messaging starts when the first user (110) sends a message to the second user. As soon as the first user (110) sends the message, the first user (110) notices several mistakes with the message, and tries to send a correction in a rush, and as soon as possible. (FIG. 1) Assuming that such a rush for correction does not contribute to making more mistakes, the attempt to correction is shown in FIG. 2 as currently done in prior art.

At this point, the second user needs to return to the original message it received, and read it again along with the newly given corrections. The corrections are supposed to help fully understand what was meant by the first message. Note that turning on the spell checking would not have solved the issue in this scenario. This is because the words do not necessarily have to be spelled incorrectly in order for a sentence to be completely meaningless. Grammar checking is also not a problem-free solution as the incorrect sentence can be grammatically correct while still being meaningless.

Figure 3:
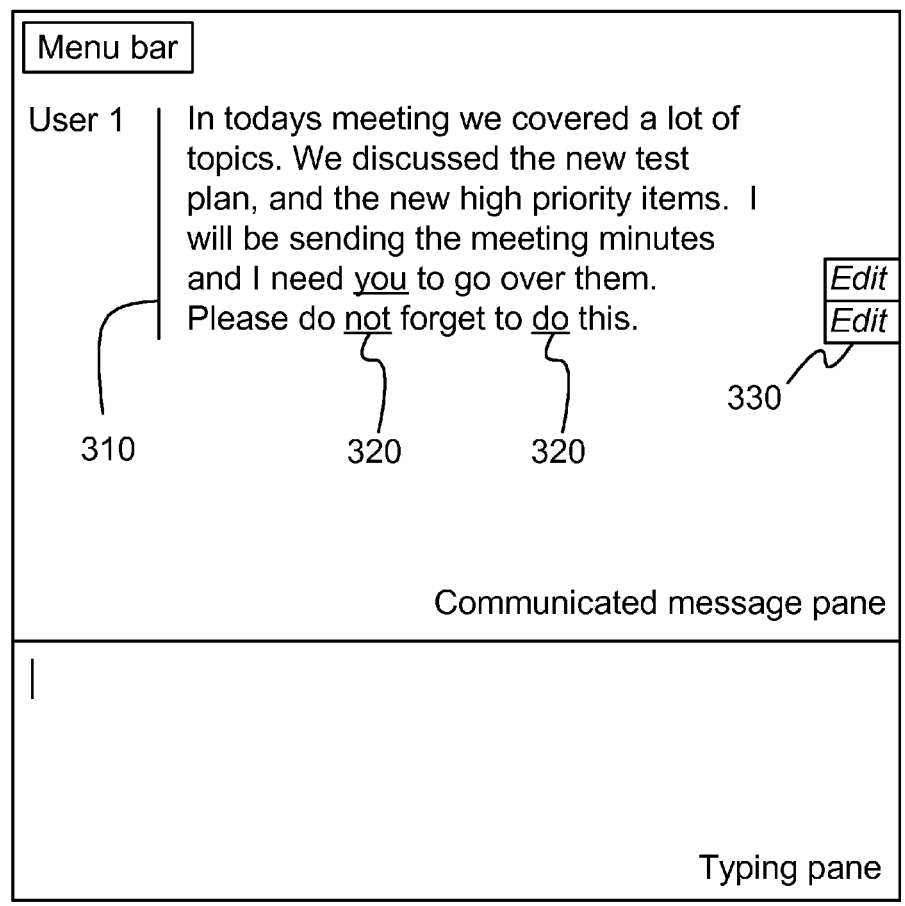
FIG. 3 depicts the way this invention proposes to resolve the problem by editing the incorrect parts of the original message, as an example.

In one embodiment, this invention solves this problem by allowing the original and/or target user to modify the chat message, which has already been communicated, when a mistake has been made. As shown in FIG. 3, in our example, when the first user notices the mistake, it puts the cursor over the previously sent message, edits it, and once the revision is made, presses ENTER. The corrected words can be highlighted, colored, underlined (320), or otherwise re-formatted for the purpose of notification. There can be other ways of notification as to which sections of the instant message has been edited such as adding tags such as "edited (330)" or another indication such as a vertical line (310).

An implementation of this invention can track changes using a color scheme, for example, blue to denote words that were added, red and strikeout for words that were removed (not shown in the figures). There would also be visual notification to allow a user change the sentence, and/or notify the recipients that a sentence was just edited. The other chat users would automatically see these changes in a new message with the edited changes, or the previous message they had received, would dynamically change to a new edited version with the same color scheme.

In one embodiment, the implementation of this invention would require modification to the user interface and the instant messaging software, to allow editing previously sent messages. Once the changes are made, the new message is sent to the target clients. The message would be tagged as an edited message and the target client would then add logic to redisplay the new message at the position where the old message was displayed. It is carefully done by handling the new size of the message accordingly, and adapting the user interface appropriately.

Therefore, in one embodiment, such instant messaging sessions can have a sending and one or more recipient user clients. The sending user edits the previously sent message on its client by changing, adding, and/or deleting words. Then the changed message is sent to the recipients and is tagged as "edited," for instance.

The changed message is displayed with change tracking on both sending and receiving clients, either as a newly-received message or as an edited previously-received message (by resizing and adjusting the display and content as designed in the software or by user-customization).

In this embodiment, as mentioned above, edit tracking comprises of visual notifications, such as color scheme (blue for "new" and red for "deleted"), underline for "new", and strike-through for "deleted". It can also include other visual notifications such as vertical track line and edit mark.

In one embodiment, a method for dynamic correction of a message in an instant message system is presented. The method comprises the steps of: a first user sending an instant message to a second user; the first user dynamically editing the content of the instant message; the first user resending the dynamically edited instant message to the second user; tagging the dynamically edited instant message as an edited instant message; displaying the dynamically edited instant message, with a change tracking highlighted, for both the first user and the second user; and identifying deletion, addition, cut, paste, and editing of the dynamically edited instant message by resizing, changing fonts, adjusting display, adjusting content, visual notification, color coding, vertical track mark, and edit mark.

A system, apparatus, or device comprising one of the following items is an example of the invention: social web site, meeting organizer, IM, email server, server, client device, PDA, mobile device, cell phone, storage to store the messages, router, switches, network, communication media, cables, fiber optics, physical layer, buffer, nodes, packet switches, computer monitor, or any display device, applying the method mentioned above, for purpose of invitation, messaging, or meeting management.

Any variations of the above teaching are also intended to be covered by this patent application.

The invention claimed is:

1. A method for dynamic correction of a message in an instant message system, said method comprising the steps of:
a first user sending an instant message to a second user;
said first user dynamically editing the content of said instant message;
said first user resending said dynamically edited instant message to said second user;
tagging said dynamically edited instant message as an edited instant message;
displaying said dynamically edited instant message, with a change tracking highlighted, for both said first user and said second user; and
identifying deletion, addition, cut, paste, and editing of said dynamically edited instant message by resizing, changing fonts, adjusting display, adjusting content, visual notification, color coding, vertical track mark, and edit mark;
wherein the dynamically edited instant message is redisplayed at the position where the unedited instant message was displayed.

* * * * *